(12) United States Patent
Clifford et al.

(10) Patent No.: US 8,549,045 B2
(45) Date of Patent: Oct. 1, 2013

(54) TEST DATA GENERATION AND SCALE UP FOR DATABASE TESTING USING UNIQUE COMMON FACTOR SEQUENCING

(75) Inventors: Austin Clifford, Dublin (IE); Konrad Emanowicz, Dublin (IE); Enda McCallig, Dublin (IE); Gary Murtagh, Dublin (IE); Clare Scally, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 12/982,742

(22) Filed: Dec. 30, 2010

(65) Prior Publication Data
US 2012/0173587 A1 Jul. 5, 2012

(51) Int. Cl.
*G06F 17/30* (2006.01)
*G06F 7/00* (2006.01)

(52) U.S. Cl.
USPC .......................................... 707/802

(58) Field of Classification Search
None
See application file for complete search history.

(56) References Cited

U.S. PATENT DOCUMENTS

| | | | |
|---|---|---|---|
| 5,542,043 A * | 7/1996 | Cohen et al. | 714/32 |
| 2007/0282798 A1* | 12/2007 | Akilov et al. | 707/3 |
| 2008/0082563 A1* | 4/2008 | Arras et al. | 707/101 |

OTHER PUBLICATIONS

Chays, "Test Data Generation for Relational Database Applications," Technical Report, Polytechnic University, Jan. 12, 2005.
Korel, "Automated Software Test Data Generation," IEEE Trans. on Software Engineering, Aug. 1990, vol. 16, No. 8.

* cited by examiner

*Primary Examiner* — Usmaan Saeed
*Assistant Examiner* — Michele Choi
(74) *Attorney, Agent, or Firm* — Steven M. Greenberg, Esq.; Carey, Rodriguez, Greenberg & O'Keefe

(57) ABSTRACT

Embodiments of the present invention provide a system and computer program product for test data generation using unique common factor sequencing. In an embodiment of the invention, a computer program product for test data generation using unique common factor sequencing is provided. The computer program product includes loading a table for population with test data in a test data generation tool executing in memory of a computer. A column set of multiple columns in the table associated with a key to the table is selected for processing and different cardinality sequence values are assigned to the columns in the set such that the cardinality sequence values do not share a common factor except for unity as in the case of prime numbers.

12 Claims, 2 Drawing Sheets

TEST DATA GENERATION AND SCALE UP FOR DATABASE TESTING USING UNIQUE COMMON FACTOR SEQUENCING

BACKGROUND OF THE INVENTION

1. Field of the Invention

The present invention relates to test data generation for large data sets and more particularly to test generation of data for database testing.

2. Description of the Related Art

A necessary step in the introduction of any new technology in a database system is to test its behavior across a wide range of operating conditions. This often involves selecting a set of test databases, generating representative query workloads, and executing these workloads on the test databases to evaluate the effect of the new technology. The importance of testing and benchmarking has long been recognized in the database community and there are several standard benchmarks developed for various settings.

While these standard benchmarks serve as useful reference points, there is often a need to generate test databases that satisfy certain properties on (for instance) table size, column domains, skew on columns and correlation between columns. To this end database developers traditionally generate synthetic data that satisfies required properties to adequately test the integrity and functionality of a database.

Of note, modern information systems work with extra large data sets. Thus, despite the sophistication and expected integrity of a database application and the quality of a set of test data created by a developer to test a database application, the proper operation of the database application cannot be assured under real life circumstances. To approach simulation of real life circumstances, testing with an extra large data set is an element of best practices management in testing a database prior to deployment. Yet, access to a reliably large enough data set for use in testing all facets of a database application is not the norm. Rather, customarily, the data for the large data set must be generated in an automated fashion.

Test data generators perform just this function. Generally, a test data generator can be viewed as a utility that generates at the minimum, raw data, and for more sophisticated implementations, raw data, tables, views, and procedures for database testing purposes, performance testing, quality assurance testing, loading tests or usability testing. Integral to the generation of any test data set, however, is the creation of a fact table and a number of dimension tables. As it is well known, a fact table in the field of data warehousing consists of the measurements, metrics or facts of a business process. The fact table is often located at the centre of a star schema or a snowflake schema, surrounded by dimension tables and provide the additive values that act as independent variables by which dimensional attributes are analyzed. Dimension tables, in turn, contain attributes or fields used to constrain and group data when performing data warehousing queries.

In generating data for the different columns of a fact table, random data is selected according to a sequence. In this regard, because the column or columns of the fact table forming a primary key into the fact table must be unique, the sequence used in auto-populating the record fields of those columns must avoid duplication through a cardinality of sequence (the number of values in a sequence before the sequence repeats such as a cardinality of three for the sequence A, B, C, A, B, C, A, B, C or the cardinality of two for the sequence X, Y, X, Y, X, Y) that is too small. The same problem exists for the column or columns of the fact table forming a foreign key into a dimension table. Also, the same problem exists for the column or columns of the fact table used in a table join with other tables.

BRIEF SUMMARY OF THE INVENTION

Embodiments of the present invention address deficiencies of the art in respect to the generation of large data sets for database testing and provide a novel and non-obvious system and computer program product for test data generation using unique common factor sequencing. In an embodiment of the invention, a computer program product for test data generation using unique common factor sequencing is provided. The computer program product includes loading a table for population with test data in a test data generation tool executing in a memory of a computer. A column set of multiple columns in the table associated with a key to the table can be selected for processing and different cardinality sequence values are assigned to the columns in the set such that the cardinality sequence values do not share a common factor except for unity as in the case of prime numbers.

Thereafter, data is generated for the specified number of rows of each column in the column set according to the formula currentRowValue=((row_number−1) % cardinality_value)+1 and random data is additionally generated for other columns of the table without regard to any particular cardinality sequence value. Finally, the table can be persisted for use in database testing. Of note, in one aspect of the embodiment, the method can include scaling up the table to a new table of an original upper portion and an added lower portion by continuing into the added lower portion a sequence for each column in the set of columns based upon corresponding ones of the cardinality sequence values, while duplicating data in the other columns of the data in the added lower portion.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for test data generation using unique common factor sequencing. In accordance with an embodiment of the invention, a set of columns for a table of test data each can be assigned a different cardinality of sequence for generating a sequence of data that repeats according to a respective cardinality. The cardinality of sequence for each column can be selected not to include a common factor other than unity amongst the columns. Thereafter, data can be generated for the set of columns according to the cardinality of sequence for each column. Data can be generated randomly for other columns to the table without regard to any particular cardinality of sequence. Additionally, the resultant fact table can be scaled up by continuing the sequence for the set of columns while simply duplicating the data in the other columns of the data. In this way, the fact table can be created quickly without risking duplicate keys or joins.

Figure 1:
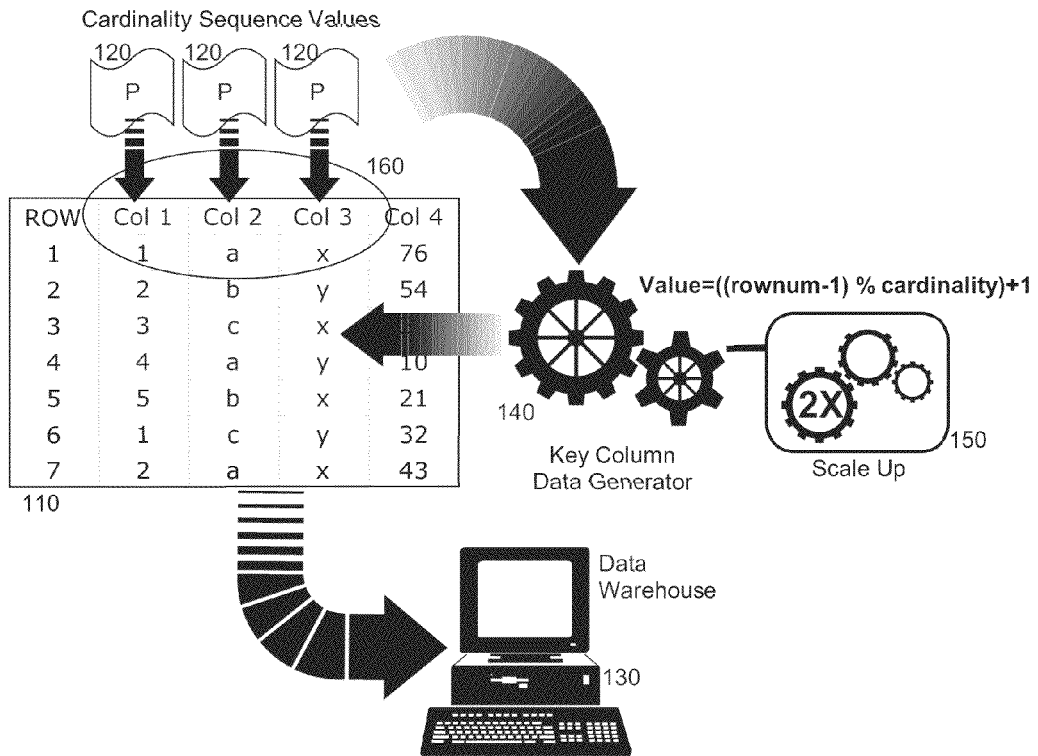
FIG. 1 is a pictorial illustration of a process for test data generation using unique common factor sequencing.

In further illustration, FIG. 1 is a pictorial illustration of a process for test data generation using unique common factor sequencing. As shown in FIG. 1, a table 110 such as a fact table or base data set containing full dimension tables (the full cartesian product of the key columns of the table) can be defined for population with automatically generated test data for testing a database 130. One or more key column sets 160 of one or more key columns can be specified in the table 110 (only a single key column set shown in FIG. 1 for the purpose of illustrative simplicity). Of import, cardinality sequence values 120 can be specified for each column of the set 160. However, the cardinality sequence values 120 for each individual column of the set 160 cannot share a common factor other than unity. In this regard, in one aspect of the embodiment illustrated in FIG. 1, the cardinality sequence values 120 can be different prime numbers "P" for instance 5, 3, and 2.

Thereafter, key column data generator 140 can generate a different sequence of data for each column in the set 160 to repeat after the cardinality sequence value for a specified number of rows of the table 110. The key column data generator 140 further can generate a different sequence of data for each column in different sets (not shown) of key columns or join columns—that is columns used to refer to a record in another table for combination with the records of the table 110. In the case of a join column set, the columns of other tables referenced by the join columns are assigned the same cardinality sequence value 120 as that of the corresponding join columns. In any event, the data for each column in a key column or join column can be computed according to the formula currentRowValue=((row_number−1) % cardinality_value)+1. Subsequently, the remaining columns of the table 110 can be populated with random data. Optionally, scale up processor 150 can augment the table 110 by duplicating the random data while expanding the sequences of the key columns and join columns so as to ensure unique combinations of each row of the key column and join column sets.

Figure 2:
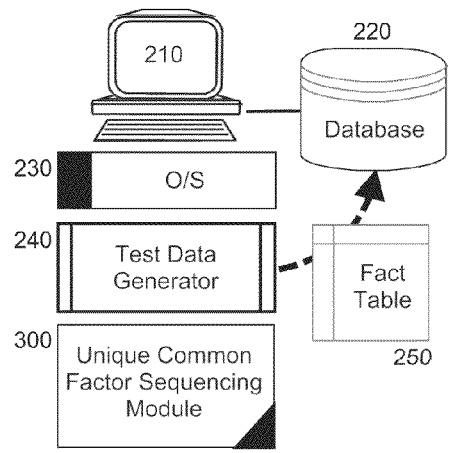
FIG. 2 is a schematic illustration of a test data generation data processing system configured for test data generation using unique common factor sequencing; and, FIG. 3A is a flow chart illustrating a process for test data generation using unique common factor sequencing.

The process described in connection with FIG. 1 can be implemented in a test data generation data processing system. In further illustration, FIG. 2 schematically shows a test data generation data processing system configured for test data generation using unique common factor sequencing. As shown in FIG. 2, the system can include a host computer 210 with at least one processor and memory. An operating system 230 can execute in the memory of the host computer 210 and can support the operation of a test data generator 240 configured to generate test data in a base data table 250 such as a fact table of a database 220. Finally, the system can include a unique common factor sequencing module 300 coupled to the test data generator 240.

The unique common factor sequencing module 300 can include program code that when executed in the memory of the host computer 210 can be enabled to select one or more columns of the table 250 as a key column set or join column set. The program code of the unique common factor sequencing module 300 further can be enabled to establish a different cardinality sequence value for each column in the set subject to the constraint that each different cardinality sequence value cannot share a common factor with another cardinality sequence value for another column in the set. To ensure that each different cardinality sequence value does not share a common factor with another cardinality sequence value for another column in the set, each different cardinality sequence value can be established as a prime number.

The program code of the unique common factor sequencing module 300 further can be enabled upon execution in the memory of the host computer 210 to generate sequences of data for each column of the key column set according to a corresponding established cardinality sequence value. In this regard, the column data generation formula of unique common factor sequencing module 300 can be applied to populate the row values of the key column set. For instance, a key column set for three columns with respective cardinality sequence values of 5, 3 and 2 can produce the five by five fact table embedded herein:

| ROW NUM | COLUMN 1 | COLUMN 2 | COLUMN 3 | COLUMN 4 | COLUMN 5 |
|---|---|---|---|---|---|
| 1 | 1 | 1 | 1 | 65 | 23 |
| 2 | 2 | 2 | 2 | 56 | 53 |
| 3 | 3 | 3 | 1 | 67 | 59 |
| 4 | 4 | 1 | 2 | 76 | 79 |
| 5 | 5 | 2 | 1 | 87 | 98 |

Figure 3A:
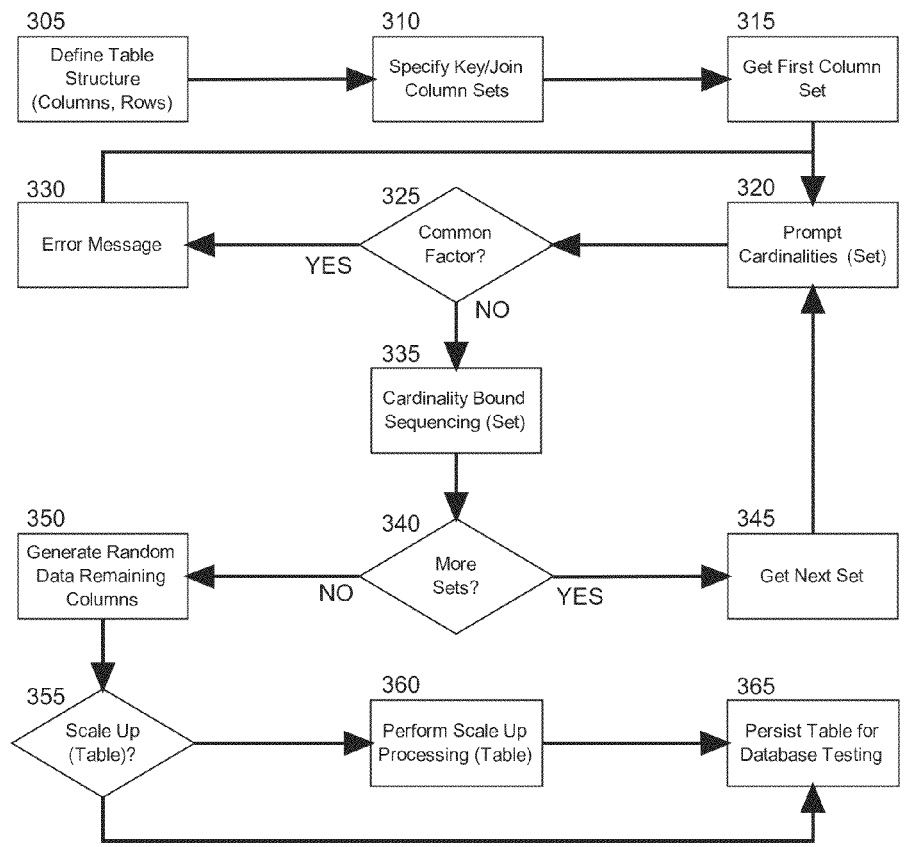
FIG. 3B is a flow chart illustrating a process for scaling up a table generated using unique common factor sequencing.

In yet further illustration of the operation of the unique common factor sequencing module 300, FIG. 3A is a flow chart illustrating a process for test data generation using unique common factor sequencing. Beginning in block 305, a table structure of a specified number of columns and rows can be defined for a table of base data for a database, such as a fact table. In block 310, one or more columns of the table can be specified to form one or more key column set or join column sets. In block 315, a first column set can be selected for processing. In block 320, a set of cardinality sequence values can be established for the column or columns of the column set. In decision block 325, it can be determined whether or not the established cardinality sequence values do not share a common factor other than unity. If it is determined that the established cardinality sequence values share a common factor other than unity, in block 330 an error message can be displayed and again in block 320, a set of cardinality sequence values can be established for the column or columns of the column set.

In decision block 325, if it is determined that the established cardinality sequence values do not share a common factor other than unity, in block 335, the row values for each column in the column set can be populated with different values resulting from a sequence of value computed according to the formula:

$$\text{currentRowValue} = ((\text{row\_number}-1) \% \text{ cardinality\_value}) + 1$$

In decision block 340, if additional column sets for keys or joins remain to be processed, in block 345 a next column set can be retrieved for processing and the process can repeat through block 320. Otherwise, in block 350 random data can be generated for the remaining columns of the table.

Figure 3B:
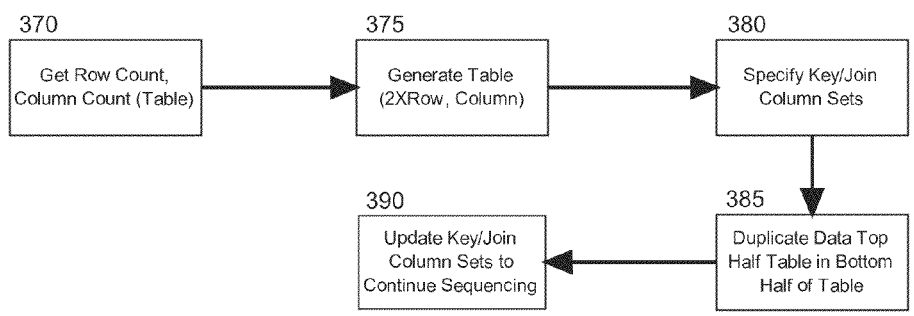

In decision block 355, it can be determined whether or not to scale up the table produced through the operation of blocks 335 and 350. If not, the table as generated can be persisted for database testing in block 365. Otherwise, in block 360, scale up processing can be performed on the table. In more particular illustration, FIG. 3B is a flow chart illustrating a process for scaling up a table generated using unique common factor sequencing. Beginning in block 370, a row count and column count can be determined for the table. In block 375, a new table can be generated to include additionally rows and columns. In block 380, one or more columns of the table can be specified to form one or more key column set or join column sets that correspond to the column sets of the original table. In block 385, the data of the original table can be copied into an upper portion of the new table corresponding to the original table and also a new, lower portion of the new table.

However, in block 390, the column sets of the lower portion of the new table can be updated to continue the sequencing according to the modified cardinality sequence values assigned to each column in the column sets. In this regard, the values of the rows of the columns in the column set in the lower portion of the new table can be computed according to the formula:

$$modifiedRowValue = (L + V - 1\% R) + 1$$

where L is the last value in the original table for the column, V is the existing value for the row of the column and R is the range for the column. Of note, a modified form of the foregoing formula for scaling up a fact table can be applied to scale up dimension tables as follows:

$$modifiedRowValue = (L + V - 1\% R) + 1 + (M - R)$$

where L is the last value in the original table for the column, V is the existing value for the row of the column, M is the maximum value for the column in the dimension table and R is the range for the column.

Of note, the scaling up process described above can be augmented to provide scalability when addressing hash distributed tables. In this regard, to ensure the integrity of the foregoing process when performed in isolation on different servers in parallel for hash partitioned tables, no hash distribution key columns are scaled up. Instead, hash distribution key columns are duplicated during the scaling up process. In the instance where there is only a single column hash distribution key, the number of rows inserted into the upper and lower portions of the new table must be either a multiple of the range of the column, or a prime number less than the range of the column. In the instance where there is a composite hash distribution key of multiple columns, a range is calculated for the distribution key as a whole to be the largest prime number less than the product of the ranges of all of the columns of the composite hash distribution key. Subsequently, the number of rows created for the upper and lower portions of the new table must be either a multiple of the range, or a prime number less than the range.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A test data generation data processing system comprising:
a host computer with at least one processor and memory;
a test data generator configured to generate test data executing in the memory of the host computer; and
a unique common factor sequencing module coupled to the test data generator, the module comprising program code configured to:
select in a table loaded for test data generation in the test data generator, a column set of multiple columns in the table associated with a key to the table;
assign different cardinality sequence values to the columns in the set, wherein the cardinality sequence values do not share a common factor except for unity;
generate data for a specified number of rows of each column in the column set according to a formula currentRowValue=((row_number−1) % cardinality_value)+1;
additionally generate random data for other columns of the table without regard to any particular cardinality sequence value; and
persist the table for use in database testing.

2. The system of claim 1, wherein the unique common factor sequencing module further comprises scaling up logic configured to scale up the table to a new table of an original upper portion and an added lower portion by continuing into the added lower portion a sequence for each column in the set of columns based upon corresponding ones of the cardinality sequence values, while duplicating data in the other columns of the table in the added lower portion.

3. The system of claim 2, wherein the scale up logic continues into the added lower portion a sequence for each column in the set of columns based upon the formula:

modifiedRowValue=$(L+V-1\% R)+1$, where L is a last value in the table for the column, V is an existing value for a row of the column in the new table and R is a range for the column in the new table, while duplicating data in the other columns of the table in the added lower portion.

4. The system of claim 2, wherein the scale up logic continues into the added lower portion a sequence for each column in the set of columns based upon the formula:

modifiedRowValue=$(L+V-1\% R)+1+(M-R)$, where L is a last value in the table for the column, V is an existing value for a row of the column in the new table, M is a maximum value for the column in the new table and R is a range for the column in the new table, while duplicating data in the other columns of the table in the added lower portion.

5. The system of claim 2, wherein the scaling up logic identifies at least one column of the table corresponding to a hash distribution key, and duplicates data from all columns of the table that corresponds to the hash distribution key into the new table, but creates both the original upper portion and the added lower portion of the new table, each with a number of new rows as a prime number less than or equal to a product of ranges of the columns corresponding to the distribution key.

6. The system of claim 1, wherein the cardinality sequence values are different prime numbers.

7. A computer program product for test data generation using unique common factor sequencing, the computer program product comprising a non-transitory computer readable storage medium having computer readable program code embodied therewith, the computer readable program code comprising:

computer readable program code for loading a table for population with test data in a test data generation tool executing in a memory of a computer;

computer readable program code for selecting a column set of multiple columns in the table associated with a key to the table;

computer readable program code for assigning different cardinality sequence values to the columns in the set, wherein the cardinality sequence values do not share a common factor except for unity;

computer readable program code for generating data for a specified number of rows of each column in the column set according to a formula currentRowValue=((row_number−1) % cardinality_value)+1;

computer readable program code for additionally generating random data for other columns of the table without regard to any particular cardinality sequence value; and computer readable program code for persisting the table for use in database testing.

8. The computer program product of claim 7, further comprising computer readable program code for scaling up the table to a new table of an original upper portion and an added lower portion by continuing into the added lower portion a sequence for each column in the set of columns based upon corresponding ones of the cardinality sequence values, while duplicating data in the other columns of the table in the added lower portion.

9. The computer program product of claim 8, wherein the computer readable program code for continuing into the added lower portion a sequence for each column in the set of columns based upon corresponding ones of the cardinality sequence values, while duplicating data in the other columns of the table in the added lower portion, comprises computer readable program code for continuing into the added lower portion a sequence for each column in the set of columns based upon the formula:

$$modifiedRowValue=(L+V-1\% R)+1,$$

where L is a last value in the table for the column, V is an existing value for a row of the column in the new table and R is a range for the column in the new table, while duplicating data in the other columns of the table in the added lower portion.

10. The computer program product of claim 8, wherein the computer readable program code for continuing into the added lower portion a sequence for each column in the set of columns based upon corresponding ones of the cardinality sequence values, while duplicating data in the other columns of the table in the added lower portion, comprises computer readable program code for continuing into the added lower portion a sequence for each column in the set of columns based upon the formula:

$$modifiedRowValue=(L+V-1\% R)+1+(M-R),$$

where L is a last value in the table for the column, V is an existing value for a row of the column in the new table, M is a maximum value for the column in the new table and R is a range for the column in the new table, while duplicating data in the other columns of the table in the added lower portion.

11. The computer program product of claim 8, further comprising:

computer readable program code for identifying at least one column of the table corresponding to a hash distribution key; and computer readable program code for duplicating data from all columns of the table that corresponds to the hash distribution key into the new table, but creating both the original upper portion and the added lower portion of the new table, each with a number of new rows as a prime number less than or equal to a product of ranges of the columns corresponding to the distribution keys.

12. The computer program product of claim 7, wherein the computer readable program code for assigning different cardinality sequence values to the columns in the set, wherein the cardinality sequence values do not share the common factor except for unity, comprises computer readable program code for assigning the different cardinality sequence values to the columns in the set, wherein the cardinality sequence are different prime numbers.

* * * * *